Sept. 18, 1945.  J. D. COLDWELL  2,384,890
REVERSIBLE STEERING MECHANISM FOR MECHANICALLY PROPELLED VEHICLES
Filed July 13, 1942  4 Sheets-Sheet 1

INVENTOR
Joe Davidson Coldwell
BY Walter Gunn
ATTORNEY

Sept. 18, 1945.     J. D. COLDWELL     2,384,890

REVERSIBLE STEERING MECHANISM FOR MECHANICALLY PROPELLED VEHICLES

Filed July 13, 1942     4 Sheets-Sheet 2

INVENTOR
Joe Davidson Coldwell.
BY Walter Gunn
ATTORNEY.

Patented Sept. 18, 1945

2,384,890

UNITED STATES PATENT OFFICE 2,384,890

REVERSIBLE STEERING MECHANISM FOR MECHANICALLY PROPELLED VEHICLES

Joe Davidson Coldwell, Manchester, England, assignor to E. Boydell & Company Limited, Manchester, England Application July 13, 1942, Serial No. 450,688
In Great Britain July 14, 1941

12 Claims. (Cl. 180—77)

This invention relates to mechanically propelled vehicles including especially, but not exclusively, tipping trucks of the kind known generally as a "dumper" and comprising a tipping bucket mounted on a chassis which is adapted to be driven on the road or over relatively rough ground and in which provision is made for the vehicle to be driven with the driver facing in either direction.

Such an arrangement of reversibility considerably increases the utility of the vehicle, as for example in the case of a tipping truck it can be driven as usual at the filling and tipping sites with the bucket leading whilst it can be driven between such sites, for example on a road, with the bucket behind the driver. Incidentally, when so driven on a road it satisfies the present regulations as regards "overhang" whilst, when driven in the other direction, i. e. with the bucket in front such vehicles generally do not comply with those regulations.

Reversible steering mechanism for mechanically propelled vehicles, including those of the kind aforesaid, is known in which the responsive change of direction of the vehicle is obtainable by the same conventional movement of the steering wheel in whichever direction the driver is facing, as distinct from the opposite movements of the handwheel required for driving an ordinary vehicle in reverse. In one such arrangement of steering mechanism, dual handwheels have been provided, arranged on opposite ends of a horizontal shaft geared to the top end of a vertical steering shaft.

The object of the invention is an improved construction of reversible steering in which the steering mechanism turns with the driving seat whilst at all times being positively coupled to the steering road wheels and in which such turning reverses the sense of such coupling.

Another object of the invention is to provide pedal control mechanism for the clutch, brake, throttle, etc. such that the pedals turn with the seat so as to remain in the same relative position whilst at all times the pedals remain positively connected to the mechanism which they operate.

Figure 1:
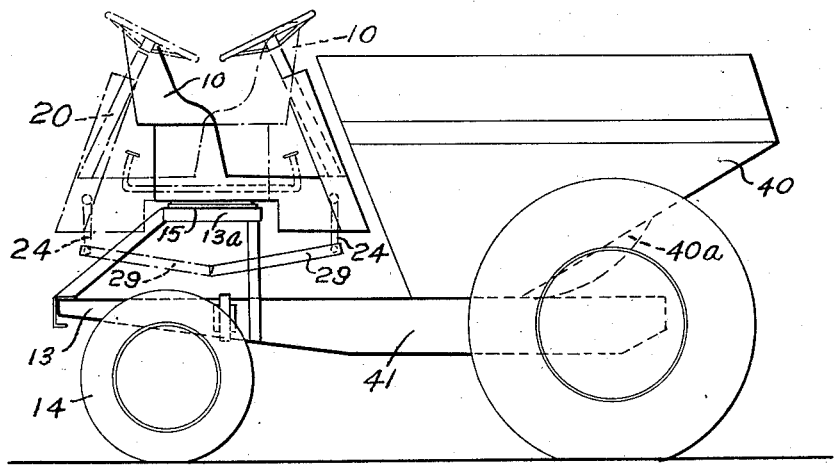
Fig. 1 is a side view of a tipping truck having a reversible seat in accordance with this invention.
Figure 5:
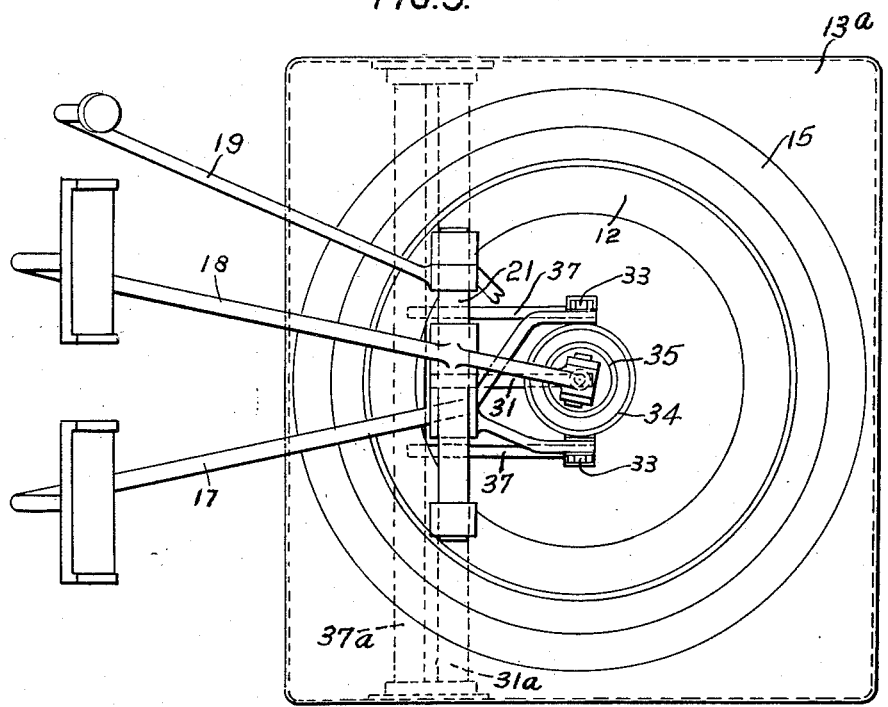
Figs. 4 and 5 are fragmentary detail views showing the construction of the control mechanism for the clutch, brakes and throttle.
Figure 2:
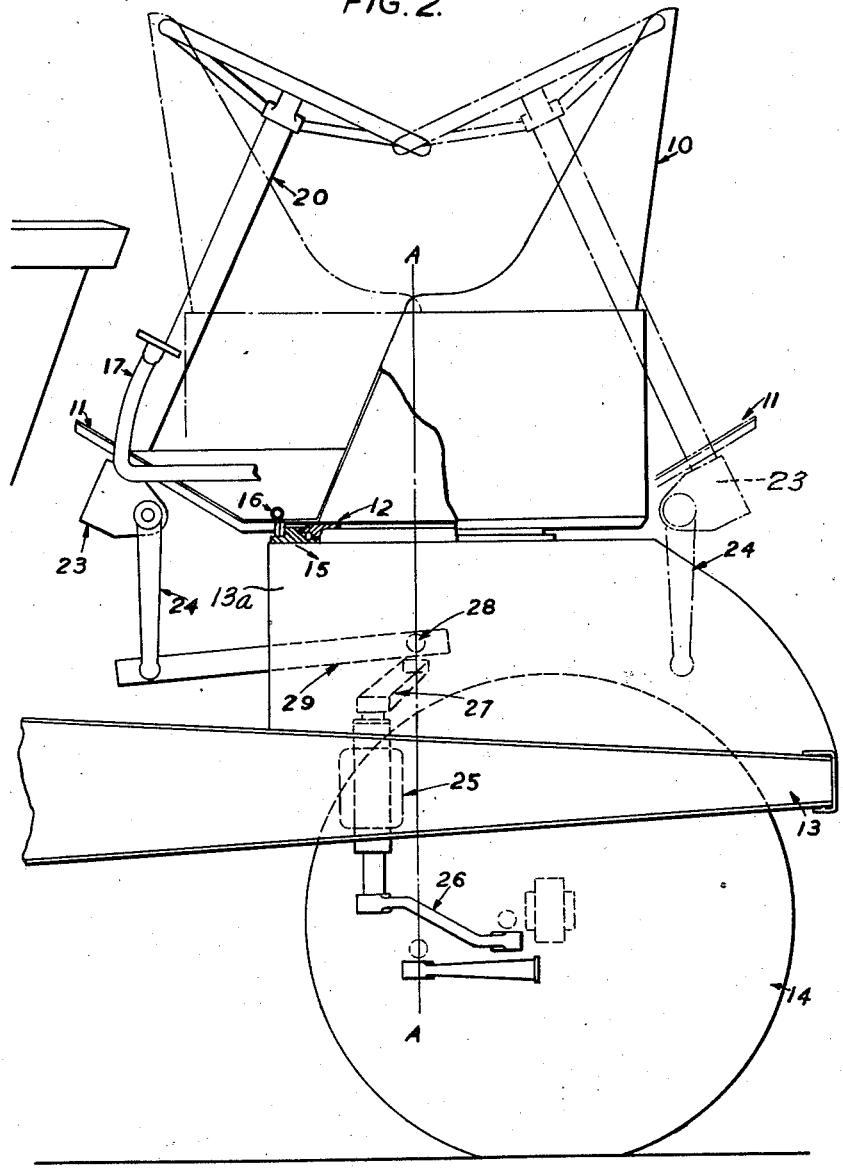
Figs. 2 and 3 are fragmentary detail views showing the construction of the reversible seat and steering mechanism.
Figure 3:
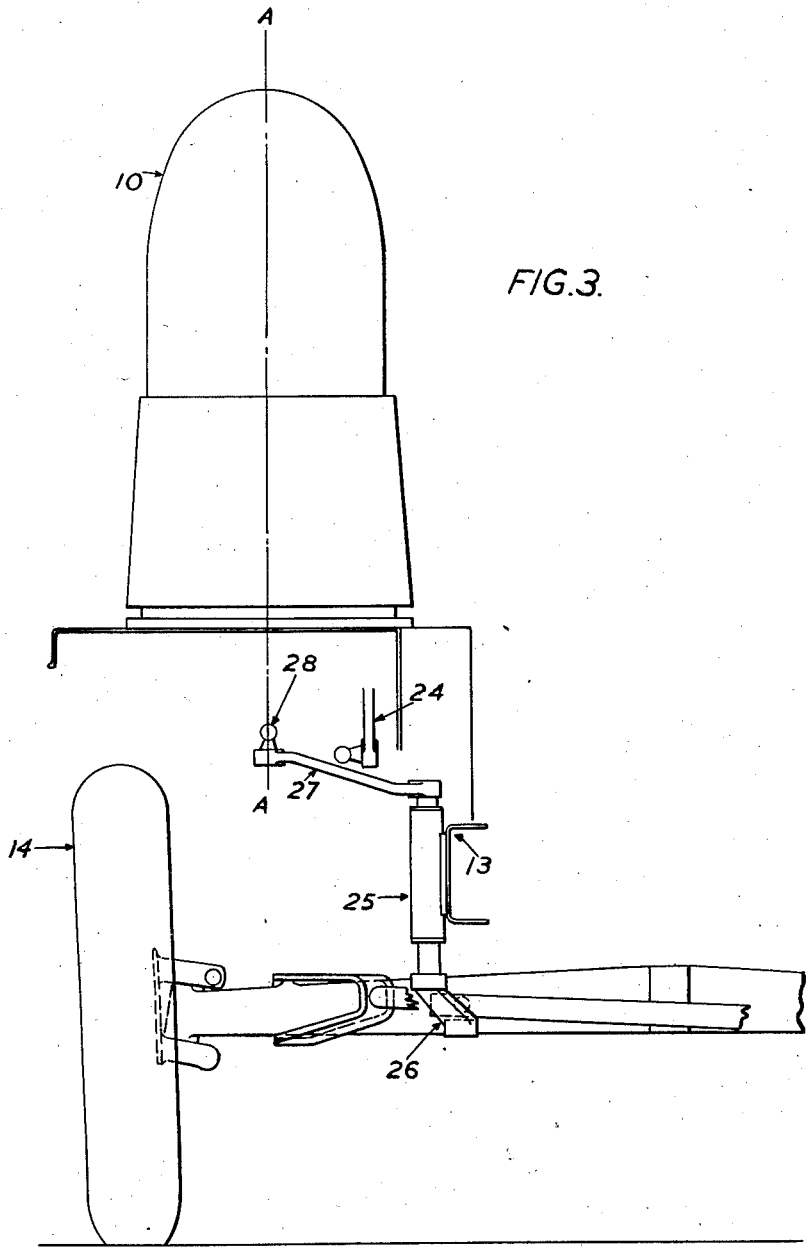
Figure 4:
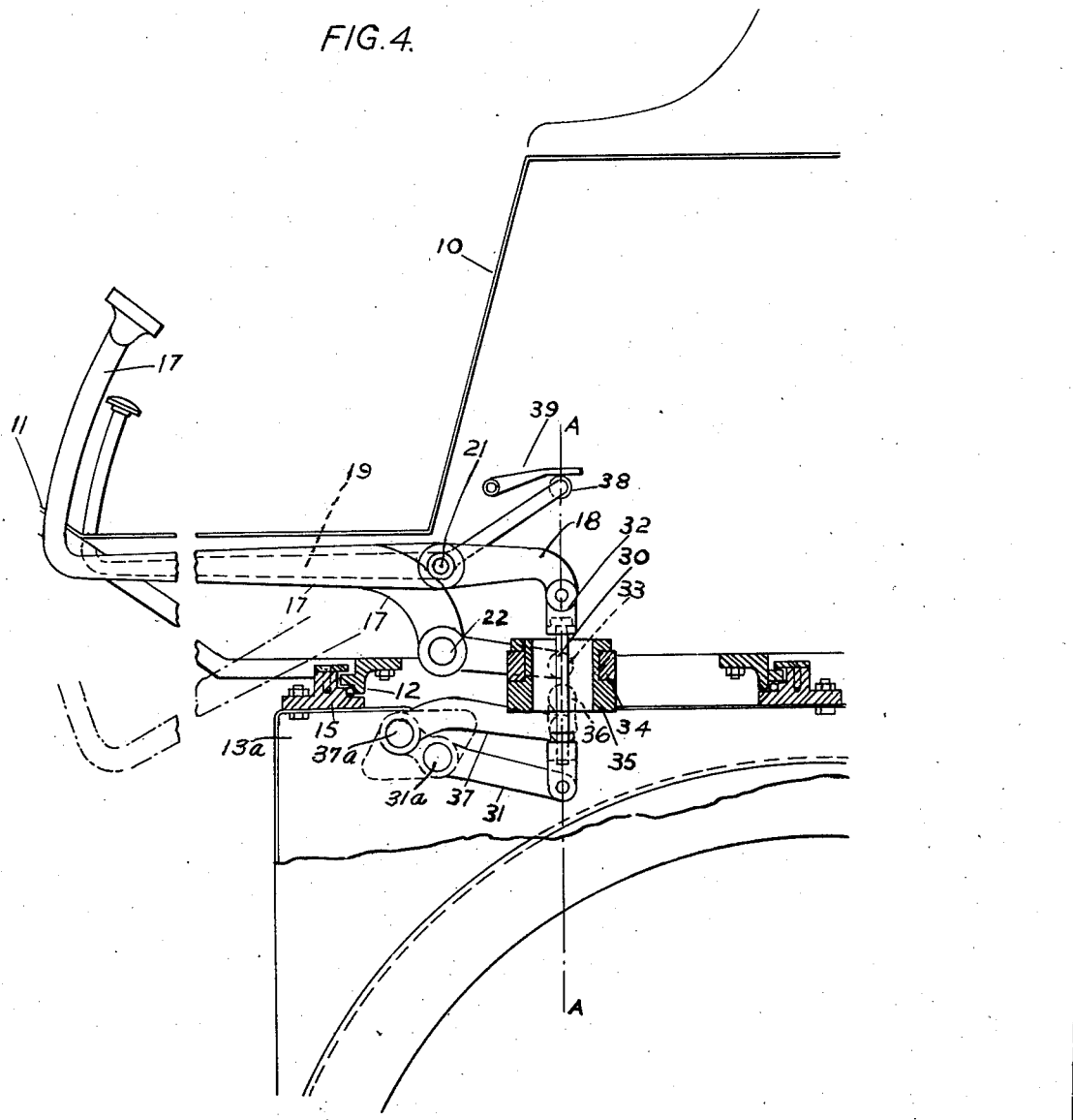

In the example of the invention shown in the drawings the driver's seat 10 is of the bucket type with a hollow pedestal and together with pedal boards 11 is fixed on the upper portion 12 of a turntable located to one side of the chassis 13 above the road steering wheels 14 and having a vertical axis A—A of rotation positioned on the tipping bucket side of the steering wheels 14. The lower portion 15 of the turntable which preferably includes a ball race, is secured to the frame structure 13a of the chassis and is so constructed that a large central aperture is provided in the turntable through which the clutch and foot brake controls operate as described later. The upper portion 12 of the turntable is adapted to be locked by a bolt 16 in either of two alternative positions, i. e. with the seat facing, or having its back to, the tipping bucket. The pedal boards 11 on the turntable are sloped in accordance with normal practice and the usual clutch, brake and throttle pedals 17, 18 and 19 respectively are provided, the brake and clutch pedals being on either side of an inclined steering column 20. Suitable brackets on the upper part of the turntable carry cross shafts 21 and 22 (see Fig. 4) on which the pedals are mounted in the usual manner whilst a further bracket carries the steering box 23, its lever arm 24 being (as shown in Fig. 2) vertical when in a central position, with the road steering wheels straight and its arc of swing being backwards and forwards relatively of the chassis in a plane relatively off-set to the axis of the turntable. The seat 10 is positioned so that a point in the centre of the front edge of the seat is approximately on the axis A—A of the turntable, so that the steering lever arm 24 is some distance forward relative to the seat, whilst the inclined steering column 20 is immediately forward of such point relative to the seat so that the steering box lever arm 24 is relatively off-set (see Fig. 3). Secured to the vehicle chassis to one side of the turntable axis is a bracket 25 carrying a lever having a vertical axis of turning, one arm 26 of which lever is below the bracket and is adapted to be coupled by a connecting rod to the steering arm on one of the road steering wheels. The other arm 27 is above the bracket 25 and carries a ball-headed pivot stud 28 and extends so that the arc of movement of such stud 28 crosses the axis of the turntable and is so arranged that when the road wheels are straight the stud will lie on such axis, whilst its arc of sweep extends forwardly and to the rear thereof. In the case of normal steering the lower arm 26 may be in line with and below the upper arm and connected by a short rod direct to the steering arm of the nearest wheel whilst for a cross steering actuation the lower arm may be at right angles to the upper and connected by a longer rod to the steering arm of the other wheel. The upper arm 27 is connected by a link 29 to the depending steering lever arm 24 of the steering box, the link being of such length that when the steering lever arm 24 is vertical the pivot stud 28 of the lever 27 is located on the axis A—A of the turntable and the link is therefore substantially tangential to the arc of movement of the lever 24. A tipping bucket 40 has rockers 40a mounted on the longitudinal members 41 (see Fig. 1) of the chassis. The relative position of the parts 26, 24 and 11 with the seat 10 reversed are shown in chain line in Fig. 2.

Thus, rotary movement of the steering wheel clockwise and anti-clockwise will swing the steering arm 24 forward and backward (or vice versa) respectively relative to the seat. When the seat is facing the tipping bucket such movement forward and backward relatively to the seat will also be forward and backward relatively to the chassis so that the end of the upper lever arm 27 will similarly move forwards and backwards. When, however, the turntable is turned so that the seat faces away from the tipping bucket the steering lever arm still moves in the same direction relative to the seat for the same rotation of the wheel but now moves in the opposite direction relative to the chassis. Consequently, when the coupling mechanism is arranged for the conventional steering when the driver is facing away from the tipping bucket (i. e. so that clockwise rotation of the wheel provides a turn to the right), the same conventional steering is also provided when the driver is facing the tipping bucket as it then provides the necessary opposite direction of turning of the road steering wheels. At the same time, the reversal does not entail any disconnection of the steering coupling mechanism, which is an important feature.

As regards the clutch, brake and throttle pedals, the brackets for the fixed shafts 21 and 22 on which the pedals are mounted, are secured below the floor boards to the upper part of the turntable, the shaft for the brake and throttle pedals being above that for the clutch pedal and at such a distance from the axis of the turntable as to provide the required leverage and pedal movement. The rear end of the brake pedal 18 is connected by a vertical rod 30 of adjustable length to the end of a lever 31 pivotally mounted on the chassis below the turntable on the cross rod 31a, the connection of such rod including a swivel 32 to permit rotation and the rod being located coaxially with the axis A—A of the turntable when the pedal is in its normal or raised position. The lever 31 on the chassis is connected by the usual rod or cable mechanism (not shown) to the wheel brakes. Movement of the pedal causes the vertical rod 30 to rise and fall whilst always remaining substantially at the axis A—A of the turntable. The rear end of the clutch pedal 17 is bifurcated to engage trunnions 33 on a collar 34 rotatably mounted on a short vertical tube 35 arranged about the vertical rod 30 of the brake mechanism and coaxial with the axis A—A of rotation of the turntable. The body of the tube 35 carries other trunnions 36 connected to a bifurcated lever 37 mounted on the chassis below the turntable on the cross rod 37a, which lever 37 is connected in the usual manner to the clutch withdrawal mechanism. The relative lengths and diameter of the rod 30 and tube 35 are such that either may move up and down through the required range of movement without interfering with the other. The throttle pedal 19 is mounted on the same shaft 21 as the brake pedal 18 and is inclined so that its rear end which is fitted with a roller 38, is located on the axis A—A on the turntable above and clear of the end of the brake lever. Above such lever, and on an upstanding bracket on the vehicle chassis, is a second lever 39, the end of which is above and engages the roller, such second lever being coupled by the usual rod or cable mechanism to the engine throttle.

In operation, the rotation of the seat 10 on its turntable is permitted by the rotation and freedom of movement of the link 29 about the pivot stud 28 and of the rod swivel 32 for the brake and of the collar 34 on its tube 35 whilst the roller 38 engaging the lever 39 turns thereon but remains in contact therewith. Thus the steering and the pedal controls operate equally with the seat in either set position.

The invention is obviously not limited to all the details of construction of the examples herein described, wherein modifications may be made without departing from the nature of the invention. For example, the invention is not limited to tipping trucks but is applicable to any vehicle chassis in which reversible driving positions are required.

What I claim is:

1. Reversible steering mechanism for a mechanically propelled vehicle having steering road wheels comprising a driving seat with adjacent steering wheel, mechanism enabling the seat with the said steering wheel to be turned on a vertical axis to face either forward or rearward of the vehicle and coupling mechanism between the steering wheel and the said road wheels articulated at a point coincident with the axis of turning of the driving seat, part of which coupling mechanism is relatively movable with the seat to opposite alternative positions relative to the articulation of such coupling mechanism so as to provide relatively reversed connection for the steering wheel in its alternative positions and thereby give the same conventional directional arrangement of steering wheel movement for both directions of facing of the seat.

2. Reversible steering mechanism for a mechanically propelled vehicle comprising a driving seat with adjacent steering wheel, mechanism enabling the said seat with the said steering wheel to be turned on a vertical axis to face either forward or rearward of the vehicle and lever and link coupling mechanism between the said steering wheel and the road wheels and articulated at a point coincident with the axis of turning of the driving seat, part of which coupling mechanism is relatively movable with the seat by said articulation to opposite alternative positions relative to a lever of such coupling mechanism.

3. Reversible steering mechanism for a mechanically propelled vehicle having steering road wheels comprising a driving seat with adjacent steering wheel, mechanism enabling the seat with the said steering wheel to be turned to face either forward or rearward of the vehicle, and articulated coupling mechanism between the steering wheel and the said road wheels, part of which coupling mechanism is relatively movable with the seat to opposite alternative positions relative to the articulation of such coupling mechanism so as to provide relatively reversed connection for the steering wheel in its alternative positions and thereby give the same conventional directional arrangement of steering wheel movement for both directions of facing of the seat, said coupling mechanism for the steering wheel comprising a bracket below and movable with the seat, a lever arm mounted therein having an arc of movement at a distance from the axis of turning of the seat, mechanism connecting the lever arm to the steering wheel for movement thereby, steering mechanism coupled to the road wheels including another lever arm having an arc of movement passing below and having its central position below the centre of rotation of the seat and a link connecting the two lever arms of such length that it is substantially tangential to the arc of movement of the first lever arm when the second lever arm is in its central position.

4. Reversible steering mechanism for a mechanically propelled vehicle according to claim 3 characterized in that the said two lever arms have arcs of movement in planes which are at right angles.

5. A mechanically propelled tipping truck comprising a chassis, a turntable mounted on the chassis, a driving seat with adjacent steering wheel, mechanism mounted on the turntable enabling the seat with the said steering wheel to be turned on a vertical axis to face either forward or rearward of the vehicle, and coupling mechanism between the steering wheel and the said road wheels articulated at a point coincident with the axis of turning of the driving seat, part of which coupling mechanism is relatively movable with the seat to opposite alternative positions relative to the articulation of such coupling mechanism so as to provide relatively reversed connection for the steering wheel in its alternative positions and thereby give the same conventional directional arrangement of steering wheel movement for both directions of facing of the seat.

6. Reversible steering mechanism for a mechanically propelled vehicle having steering road wheels comprising a driving seat with adjacent steering wheel, a turntable supporting the seat means for locating the turntable so that the seat is facing either forward or rearward of the vehicle, said steering mechanism comprising a bracket on the rotatable part of the turntable carrying the seat, a lever arm mounted therein having an arc of movement at a distance from the axis of turning of the seat, mechanism connecting the lever arm to the steering wheel for movement thereby, steering mechanism coupled to the said steering road wheels including another lever arm having an arc of movement passing below and having its central position below the centre of rotation of the seat, said first lever arm moving with the turntable to opposite alternative positions relative to the said second lever arm.

7. Reversible steering and other control mechanism for a mechanically propelled vehicle having steering road wheels, comprising a driving seat with adjacent steering wheel and other control mechanism, means enabling the seat with the said steering wheel and other control mechanism to be turned on a vertical axis to face forward or rearward of the vehicle, coupling mechanism between the steering wheel and the said road wheels articulated at a point coincident with the axis of turning of the driving seat, part of which coupling is relatively rotatable with the seat to opposite alternative positions relative to the articulation of such coupling so as to provide relatively reversed connection for the steering wheel in its alternative positions, coupling means connecting said other control mechanism with their controlled devices including a swivel joint at the axis of turning of the seat.

8. Reversible steering and other control mechanism for a mechanically propelled vehicle having steering road wheels, comprising a driving seat with adjacent steering wheel and other control mechanism, means enabling the seat with the said steering wheel and other control mechanism to be turned on a vertical axis to face forward or rearward of the vehicle, lever and link coupling mechanism between the steering wheel and the said road wheels articulated at a point coincident with the axis of turning of the driving seat, part of which coupling mechanism is relatively rotatable with the seat by said articulation to opposite alternative positions relative to a lever of such coupling mechanism, coupling means connecting said other control mechanism with their controlled devices including a part located at the axis of turning of the seat and movable relatively along such axis and including a joint rotatable about such axis.

9. Reversible steering and brake and engine control mechanism for a mechanically propelled vehicle having road wheels comprising a driving seat with adjacent steering wheel and adjacent brake and engine control pedals, mechanism enabling the seat together with the said steering wheel and control pedals to be turned on a vertical axis to face forward or rearward of the vehicle, lever and link coupling between the steering wheel and the said road wheels articulated at a point coincident with the axis of turning of the driving seat, part of which coupling is relatively rotatable with the seat by said articulation to opposite alternative positions relative to a lever of such coupling and further link and lever mechanism coupling the control pedals to their respective controlled mechanism including a swivel link located at the axis of turning of the seat.

10. Reversible steering and control mechanism for a mechanically propelled vehicle having steering road wheels and a driving seat with adjacent steering wheel and control pedals comprising a turntable, with a central aperture, supporting the seat, means for locating the turntable so that the seat is facing either forward or rearward of the vehicle, said steering mechanism comprising a bracket on the rotatable part of the turntable carrying the seat, a lever arm mounted therein having an arc of movement at a distance from the axis of turning of the seat, mechanism connecting the lever arm to the steering wheel for movement thereby, steering mechanism coupled to the said steering road wheels including another lever arm having an arc of movement passing below and having its central position below the centre of rotation of the seat, said first lever arm moving with the turntable to opposite alternative positions relative to the said second lever arm, and connecting mechanism for the control pedals and their respective controlled devices including concentric swivel links passing through the central aperture of the turntable and located on the axis of rotation, said links being axially movable independently of each other with the operation of their respective pedals.

11. A mechanically propelled vehicle comprising a power driven chassis having a driving seat with adjacent steering wheel, mechanism enabling the seat with its adjacent steering wheel to be turned on a vertical axis to face either forward or rearward of the chassis, and coupling mechanism for the steering wheel and the road wheels associated with the reversible seat and articulated at a point coincident with the axis of turning of the driving seat and relatively movable therewith by said articulation to opposite alternative positions for interchangeable coupling cooperative relation with said coupling mechanism so as to provide relatively reversible connection for the steering wheel in its alternative positions and give the same directional arrangement of steering wheel movement for both directions of facing of the seat.

12. A mechanically propelled vehicle comprising a power driven chassis having a driver's steering wheel and steering road wheels, mechanism for enabling the driver's steering wheel to be turned on a vertical axis to face either forward or rearward of the chassis, lever and link coupling between the driver's steering wheel and said road wheels articulated at a point coincident with said vertical axis of turning of the driver's steering wheel, part of said coupling by said articulation being rotatable with the driver's steering wheel to give the same directional arrangement of steering wheel movement for both positions of the driver's steering wheel, whereby when the driver's steering wheel is turned to the right or left in either position of the steering wheel the vehicle will be turned to the right or left.

JOE DAVIDSON COLDWELL.